(12) United States Patent
Voorhies et al.

(10) Patent No.: US 7,170,513 B1
(45) Date of Patent: Jan. 30, 2007

(54) SYSTEM AND METHOD FOR DISPLAY LIST OCCLUSION BRANCHING

(75) Inventors: Douglas A. Voorhies, Menlo Park, CA (US); Matthew Craighead, Santa Clara, CA (US); Mark J. Kilgard, Austin, TX (US); Edward Hutchins, Mountain View, CA (US); Cass W. Everitt, Pflugerville, TX (US)

(73) Assignee: NVIDIA Corporation, Santa Clara, CA (US)

( * ) Notice: Subject to any disclaimer, the term of this patent is extended or adjusted under 35 U.S.C. 154(b) by 835 days.

(21) Appl. No.: 10/188,697

(22) Filed: Jul. 1, 2002

Related U.S. Application Data

(60) Division of application No. 09/885,665, filed on Jun. 19, 2001, now Pat. No. 6,646,639, which is a continuation-in-part of application No. 09/585,810, filed on May 31, 2000, now Pat. No. 7,068,272, said application No. 09/885,665 is a continuation-in-part of application No. 09/121,317, filed on Jul. 22, 1998, now Pat. No. 6,480,205.

(60) Provisional application No. 60/293,250, filed on May 23, 2001.

(51) Int. Cl.
G06T 15/00 (2006.01)
(52) U.S. Cl. .................. 345/421; 345/428; 345/619
(58) Field of Classification Search ................ 345/418, 345/421, 422, 424, 428, 619
See application file for complete search history.

(56) References Cited

U.S. PATENT DOCUMENTS

| | | | |
|---|---|---|---|
| 4,996,666 A | 2/1991 | Duluk, Jr. ................... 365/49 |
| 5,025,407 A | 6/1991 | Gulley et al. .............. 364/754 |
| 5,123,085 A | 6/1992 | Wells et al. ................ 395/121 |
| 5,222,202 A | 6/1993 | Koyamada .................. 395/123 |
| 5,459,820 A | 10/1995 | Schroeder et al. .......... 395/120 |
| 5,535,288 A | 7/1996 | Chen et al. ................. 382/236 |
| 5,572,634 A | 11/1996 | Duluk, Jr. ................... 395/119 |
| 5,574,835 A | 11/1996 | Duluk, Jr. et al. .......... 395/121 |
| 5,596,686 A | 1/1997 | Duluk, Jr. ................... 395/122 |
| 5,669,010 A | 9/1997 | Duluk, Jr. ............. 395/800.22 |
| 5,694,143 A | 12/1997 | Fielder et al. ............. 345/112 |

(Continued)

FOREIGN PATENT DOCUMENTS

EP 0690430 A2 1/1996

(Continued)

OTHER PUBLICATIONS

Bartz, Dirk et al.; "Extending Graphics Hardware for Occlusion Queries in OpenGL"; Computer Graphics Lab, University of Tübingen.

(Continued)

*Primary Examiner*—Phu K. Nguyen
(74) *Attorney, Agent, or Firm*—Zilka-Kotab, PC

(57) ABSTRACT

A system and method are provided for conditional branching in a hardware graphics pipeline. Initially, a plurality of graphics commands is received. Condition data is then affected based on at least some of the graphics commands utilizing the hardware graphics pipeline. At least one of the graphics commands is then conditionally skipping based on the condition data in response to another graphics command utilizing the hardware graphics pipeline.

53 Claims, 8 Drawing Sheets

U.S. PATENT DOCUMENTS

| | | | |
|---|---|---|---|
| 5,724,561 A | 3/1998 | Tarolli et al. | 395/523 |
| 5,764,228 A | 6/1998 | Baldwin | 345/344 |
| 5,764,241 A | 6/1998 | Elliott et al. | 345/473 |
| 5,798,762 A | 8/1998 | Sfarti et al. | 345/420 |
| 5,798,770 A | 8/1998 | Baldwin | 345/506 |
| 5,801,711 A | 9/1998 | Koss et al. | 345/441 |
| 5,812,072 A | 9/1998 | Masters | 341/55 |
| 5,815,695 A * | 9/1998 | James et al. | 712/220 |
| 5,821,940 A | 10/1998 | Morgan et al. | 345/420 |
| 5,838,337 A | 11/1998 | Kimura et al. | 345/519 |
| 5,872,902 A | 2/1999 | Kuchkuda et al. | 395/130 |
| 5,886,701 A | 3/1999 | Chauvin et al. | 345/418 |
| 5,914,721 A | 6/1999 | Lim | 345/421 |
| 5,926,647 A | 7/1999 | Adams et al. | 395/800.36 |
| 5,956,042 A | 9/1999 | Tucker et al. | 345/426 |
| 5,959,689 A | 9/1999 | De Lange et al. | 348/571 |
| 5,966,532 A | 10/1999 | McDonald et al. | 395/701 |
| 5,974,538 A * | 10/1999 | Wilmot, II | 712/218 |
| 5,977,987 A | 11/1999 | Duluk, Jr. | 345/441 |
| 5,977,997 A | 11/1999 | Vainsencher | 345/519 |
| 6,000,027 A | 12/1999 | Pawate et al. | 712/39 |
| 6,014,144 A | 1/2000 | Nelson et al. | 345/426 |
| 6,046,747 A | 4/2000 | Saunders et al. | 345/430 |
| 6,057,855 A | 5/2000 | Barkans | 345/435 |
| 6,094,200 A | 7/2000 | Olsen et al. | 345/422 |
| 6,097,395 A | 8/2000 | Harris et al. | 345/426 |
| 6,137,497 A | 10/2000 | Strunk et al. | 345/434 |
| 6,144,365 A | 11/2000 | Young et al. | 345/153 |
| 6,163,319 A | 12/2000 | Peercy et al. | 345/426 |
| 6,170,052 B1 * | 1/2001 | Morrison | 712/236 |
| 6,172,679 B1 | 1/2001 | Lim | 345/421 |
| 6,198,488 B1 | 3/2001 | Lindholm et al. | 345/426 |
| 6,198,833 B1 | 3/2001 | Rangan et al. | 382/103 |
| 6,215,504 B1 | 4/2001 | Longhenry et al. | 345/443 |
| 6,219,071 B1 | 4/2001 | Krech, Jr. et al. | 345/503 |
| 6,226,003 B1 | 5/2001 | Akeley | 345/419 |
| 6,229,553 B1 | 5/2001 | Duluk, Jr. et al. | 345/506 |
| 6,242,343 B1 | 6/2001 | Yamazaki et al. | 438/633 |
| 6,246,415 B1 | 6/2001 | Grossman et al. | 345/422 |
| 6,252,608 B1 | 6/2001 | Snyder et al. | 345/473 |
| 6,268,875 B1 | 7/2001 | Duluk, Jr. et al. | 345/506 |
| 6,285,378 B1 | 9/2001 | Duluk, Jr. | 345/441 |
| 6,288,730 B1 | 9/2001 | Duluk, Jr. et al. | 345/552 |
| 6,295,599 B1 | 9/2001 | Hansen et al. | 712/32 |
| 6,304,265 B1 | 10/2001 | Harris et al. | 345/421 |
| 6,351,760 B1 | 2/2002 | Shankar et al. | 708/654 |
| 6,411,301 B1 | 6/2002 | Parikh et al. | 345/522 |
| 6,421,808 B1 | 7/2002 | McGeet et al. | 716/1 |
| 6,480,205 B1 | 11/2002 | Greene et al. | 345/631 |
| 6,771,264 B1 * | 8/2004 | Duluk et al. | 345/426 |
| 2002/0030685 A1 | 3/2002 | Brethour et al. | 345/503 |

FOREIGN PATENT DOCUMENTS

| | | |
|---|---|---|
| WO | 93/23816 | 11/1993 |
| WO | 97/05575 | 2/1997 |
| WO | 97/05576 | 2/1997 |
| WO | WO 98/28695 | 7/1998 |
| WO | WO 99/09473 | 2/1999 |
| WO | WO 99/52040 | 10/1999 |
| WO | 00/10372 | 3/2000 |
| WO | 00/11562 | 3/2000 |
| WO | 00/11602 | 3/2000 |
| WO | 00/11603 | 3/2000 |
| WO | 00/11604 | 3/2000 |
| WO | 00/11605 | 3/2000 |
| WO | 00/11607 | 3/2000 |
| WO | 00/11613 | 3/2000 |
| WO | 00/11614 | 3/2000 |
| WO | 00/19377 | 4/2000 |

OTHER PUBLICATIONS

Greene, Ned; "Hierarchical Polygon Tiling with Coverage Masks"; Apple Computer.

Greene, Ned; "Hierarchical Z-Buffer Visibility"; Apple Computer.

Xie, Feng et al; "Adaptive Hierarchical Visibility in a Tiled Architecture"; Intel Corporation.

http://www.opengl.org/developers/documentation/extensions.html pp. 1, Nov. 10, 2005.

http://oss.sgi.com/projects/ogl-sample/registry/doc/rules.html Nov. 9, 2005, pp. 1-7.

Marc Olano and Trey Greer; "Triangle Scan Conversion using 2D Homogeneous Coordinates"; 1997 SIGGRAPH/Eurographics Workshop; pp. 89-95.

Segal et al., "The OpenGL® Graphics System: A Specification (Version 1.3)", Aug. 14, 2001, Mountain View, CA, pp. 1-298.

Segal, Mark and Akeley, Kurt; The OpenGL® Graphics System: A Specification (Version 1.2.1); Apr. 1, 1999, pp. 1-280.

Olano, Marc, A Programmable Pipeline for Graphics Hardware 1998, University of North Carolina at Chapel Hill.

Marc Olano et al., A Shading Language on Graphics Hardware: The PixelFlow Shading System Jul. 1998, Orlando, Florida.

Anselmo Lastra et al., Real-Time Programmable Shading, 1995, Chapel Hill, NC.

John Eyles et al., PixelFlow: The Realization, Hewlett-Packard Company Chapel Hill Graphics Lab, North Carolina, pp. 1-13, 1996.

Mark S. Peercy et al., Interactive Multi-Pass Programmable Shading, 2000, pp. 1-8.

Conditioning Testing, London South Bank University http://www.scism.sbu.as.uk/law/Section5/chap6/s5c6p11.html, pp. 1-2, Jul. 21, 2005.

Bartz, Dirk et al.; "Extending Graphics Hardware for Occlusion Queries in OpenGL"; Computer Graphics Lab, University of Tübingen, Jan. 1998, pp. 92104.

Greene, Ned; "Hierarchical Polygon Tiling with Coverage Masks"; Apple Computer, 1996, pp. 1-13.

Greene, Ned; "Hierarchical Z-Buffer Visibility"; Apple Computer, 1993, pp. 231-238.

Xie, Feng et al; "Adaptive Hierarchical Visibility in a Tiled Architecture"; Intel Corporation, 1999, pp. 75-84, 14L.

Borgenstam, U.; Svensson, J. Shaders. Chalmers University of Technology. http://www.ce.chalmers.se/old/undergraduate/D/EDA425/lectures/shaders.pdf 2005, pp. 1-10.

Traditional Vertex Lighting Instructions. http://www.directx.com/shader/vertex/instructions.htm, Dec. 2004, pp. 1-56.

* cited by examiner

SYSTEM AND METHOD FOR DISPLAY LIST OCCLUSION BRANCHING

RELATED APPLICATION(S)

The present application is a continuation-in-part of an application entitled "SYSTEM, METHOD AND ARTICLE OF MANUFACTURE FOR Z-VALUE AND STENCIL CULLING PRIOR TO RENDERING IN A COMPUTER GRAPHICS PROCESSING PIPELINE" filed May 31, 2000 under Ser. No. 09/585,810 now U.S. Pat. No. 7,068,272; and an application entitled "MODIFIED METHOD AND APPARATUS FOR IMPROVED OCCLUSION CULLING IN GRAPHICS SYSTEMS" filed Jun. 19, 2001 under Ser. No. 09/885,665 now U.S. Pat. No. 6,646,639 which, in turn, is a continuation-in-part of an application entitled "METHOD AND APPARATUS FOR OCCLUSION CULLING IN GRAPHICS SYSTEMS" filed Jul. 22, 1998 under Ser. No. 09/121,317 now U.S. Pat. No. 6,480,205 and claims priority of a provisional patent application filed May 23, 2001 under Ser. No. 60/293,250; which are each incorporated herein by reference in their entirety for all purposes. The present application is further related to an application entitled "HARDWARE-ASSISTED Z-PYRAMID CREATION FOR HOST-BASED OCCLUSION CULLING" filed Mar. 9, 2001 under Ser. No. 09/802,684; and an application entitled "HARDWARE-ASSISTED Z-PYRAMID CREATION FOR HOST-BASED OCCLUSION CULLING" filed Mar. 9, 2001 under Ser. No. 09/802,522; which are each incorporated herein by reference in their entirety for all purposes.

FIELD OF THE INVENTION

The present invention relates to computer graphics, and more particularly to display list processing.

BACKGROUND OF THE INVENTION

Substantial improvements in graphics hardware combined with standardized graphics languages have allowed the use of complex graphics functions in many common applications. As these applications increase, more and more graphics functionality are moved from the central processing unit to the hardware graphics pipeline in a computer graphics system. Thus, the hardware graphics pipeline is now able to perform many functions so as to not slow down the performance of the computer graphics system.

Many prior art computer graphic systems are implemented with a host processor constructing and generating a display list of commands comprising graphics opcode commands and parameters which are sent to a hardware graphics pipeline. The hardware graphics pipeline takes the list of commands, or "display list" and creates or generates graphics primitives for a display device. These graphics primitives are constructed into graphics images displayed on the display device. The graphics primitives typically include points, lines, and polygons representing graphics objects rendered by the graphics processor.

Prior Art FIG. 1 illustrates a computer graphics system 100, in accordance with the prior art. The computer graphics system 100 includes one or more processors, such as processor 102, which is connected to a main memory 104. The computer graphics system 100 also includes a hardware graphics pipeline 106.

In use, a display list for the hardware graphics pipeline 106 may be supplied in series to be processed by the hardware graphics pipeline 106 by reading the display list data from linear memory locations in the main memory 104. The main memory 104 may thus include a plurality of buffers 108 with opcode commands and parameters to be carried out.

The hardware graphics pipeline 106 may be equipped with a direct memory access (DMA) module 110 for sequencing through the buffers 108 of the main memory 104.

Thus, per the foregoing display list processing method, display list commands are received sequentially into the main memory 104 in a linear array of memory locations. After some temporal period, such commands are read from the linear array of memory locations in the main memory 104. Inherent with this method is a temporal period between a time when the commands are received into the main memory 104 and executed by the hardware graphics pipeline 106.

Due to this temporal period, the hardware graphics pipeline 106 unfortunately can not rely on the processor 102 for aid during the processing of such commands. Conversely, the processor 102 can not easily manage the graphics processing being executed on the hardware graphics pipeline 106. This problem has particular ramifications during one specific type of graphics processing, namely occlusion processing. An example of such occlusion processing and how the present problem affects the same will now be set forth.

Prior Art FIG. 2 illustrates an example of graphics processing that may be carried out utilizing the computer graphics system 100 of FIG. 1, and a particular problem associated therewith. As shown, a truck 200 to be rendered is provided along with various portions 204. One of such portions 204, the engine 206, is graphically intense since it has a lot of detail to be rendered.

One common method of parsing such rendering and reducing the overall work to be performed by the hardware graphics pipeline 106 entails enclosing each of the various portions 204 with bounding volumes 208. By enclosing certain portions 204 such as the engine 206, the hardware graphics pipeline 106 may perform tests (i.e. z-value, stencil, etc.) to determine whether the particular portion 204 (i.e. the engine 206) needs to be drawn (i.e. is lid 210 closed or open). Based on such tests, it may be determined whether each of the portions 204 is visible and must be drawn.

To this end, significant work may be avoided by conditionally processing various portions 204 in the hardware graphics pipeline 106 based on the results of the foregoing tests. Unfortunately, in the computer graphics system 100 of FIG. 1, the results of the foregoing tests must be sent to the processor 102 for the decision as to whether to draw the portions 204. Thus, the occlusion tests are only effective when the processor 102 is involved in drawing the current frame, due to the latency incurred by the aforementioned temporal period. Moreover, the processor 102 often sends all of the drawing primitives of a frame before the hardware graphics pipeline 106 even begins processing the primitives.

DISCLOSURE OF THE INVENTION

A system and method are provided for conditional branching in a hardware graphics pipeline. Initially, a plurality of graphics commands is received. Condition data is then affected based on at least some of the graphics commands utilizing the hardware graphics pipeline. At least one of the graphics commands is then conditionally skipping based on the condition data in response to another graphics command utilizing the hardware graphics pipeline.

In one embodiment, the at least one graphics command may be conditionally skipped for improving a performance of the hardware graphics pipeline. As an option, the graphics commands may be received in a buffer. Further, the graphics commands may be accessed utilizing a controller of the hardware graphics pipeline coupled to the buffer.

In another embodiment, rendering may be carried out in response to the graphics commands utilizing the hardware graphics pipeline. Optionally, objects may be rendered, or bounding volumes may be rendered. Such bounding volumes may be rendered on a portion-by-portion basis. Moreover, the rendering of the bounding volume may be accelerated using a z-value culling operation.

Optionally, the condition data may be tracked in a condition data register of the hardware graphics pipeline. As an option, the condition data may be identified during the rendering utilizing the hardware graphics pipeline. Thus, the condition data may be affected by rendering initiated by the graphics commands. Further, the rendering may include a test, a result of which affects the condition data. The test may include a depth test, a stencil test, and/or a visibility test. Still yet, the condition data may be affected by a z-value culling operation.

In still another embodiment, a threshold may be identified during the rendering utilizing the hardware graphics pipeline. The aforementioned test may be performed based on the threshold during the rendering utilizing the hardware graphics pipeline. As an option, the graphics commands may define a bounding volume that is involved in a depth test utilizing the hardware graphics pipeline. Again, the condition data may be affected based on the test utilizing the hardware graphics pipeline.

In still yet another embodiment, a system may be provided for conditional branching. Provided is a buffer for receiving a plurality of graphics commands. Further, a condition data register is included for storing condition data based on the graphics commands. Coupled to the buffer and the condition data register is logic capable of conditionally skipping at least one of the graphics commands based on the condition data in response to another graphics command.

Another technique is provided for direct memory access. Initially, a plurality of pointers to graphics commands is received. Next, at least one of the pointers is used to fetch the graphics commands by direct memory access. The fetched graphics commands are then processed in a hardware graphics pipeline. At least some of the processed graphics commands affect condition data. Still yet, at least one of the graphics commands is conditionally skipped based on the condition data. Such skipping is done by not fetching the conditionally skipped commands by the direct memory access.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which.

Prior Art

Prior Art

DESCRIPTION OF THE PREFERRED EMBODIMENTS

Figure 1:
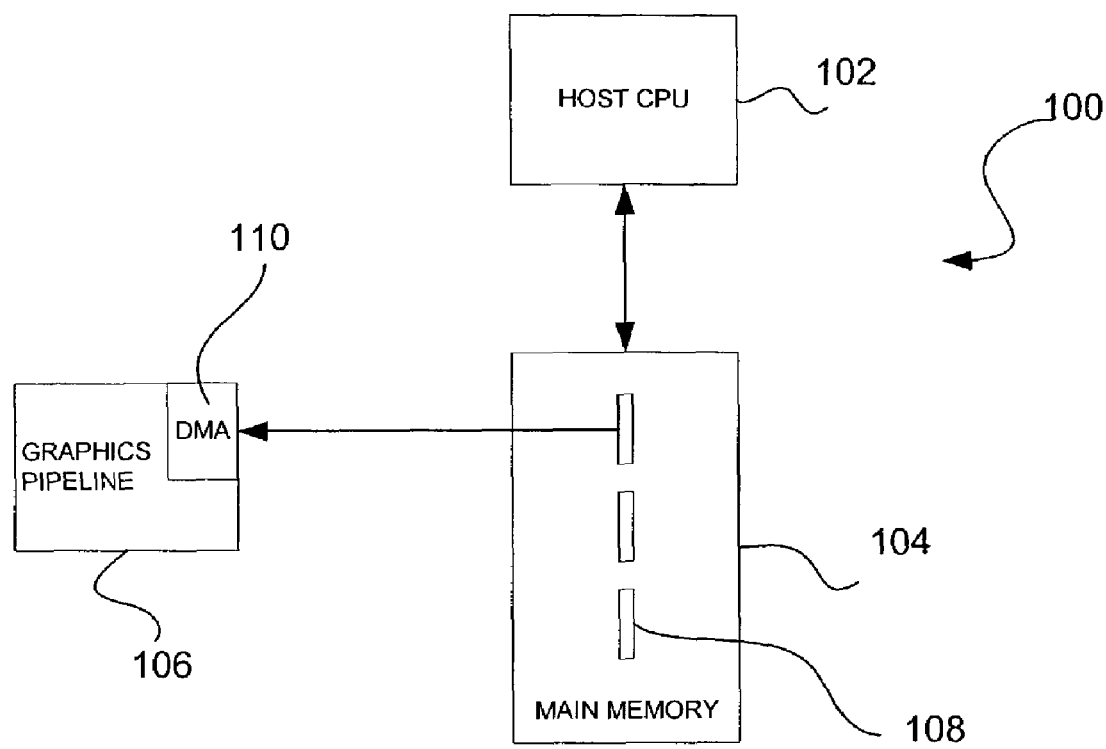
FIG. 1 illustrates a computer graphics system, in accordance with the prior art.
Figure 2:
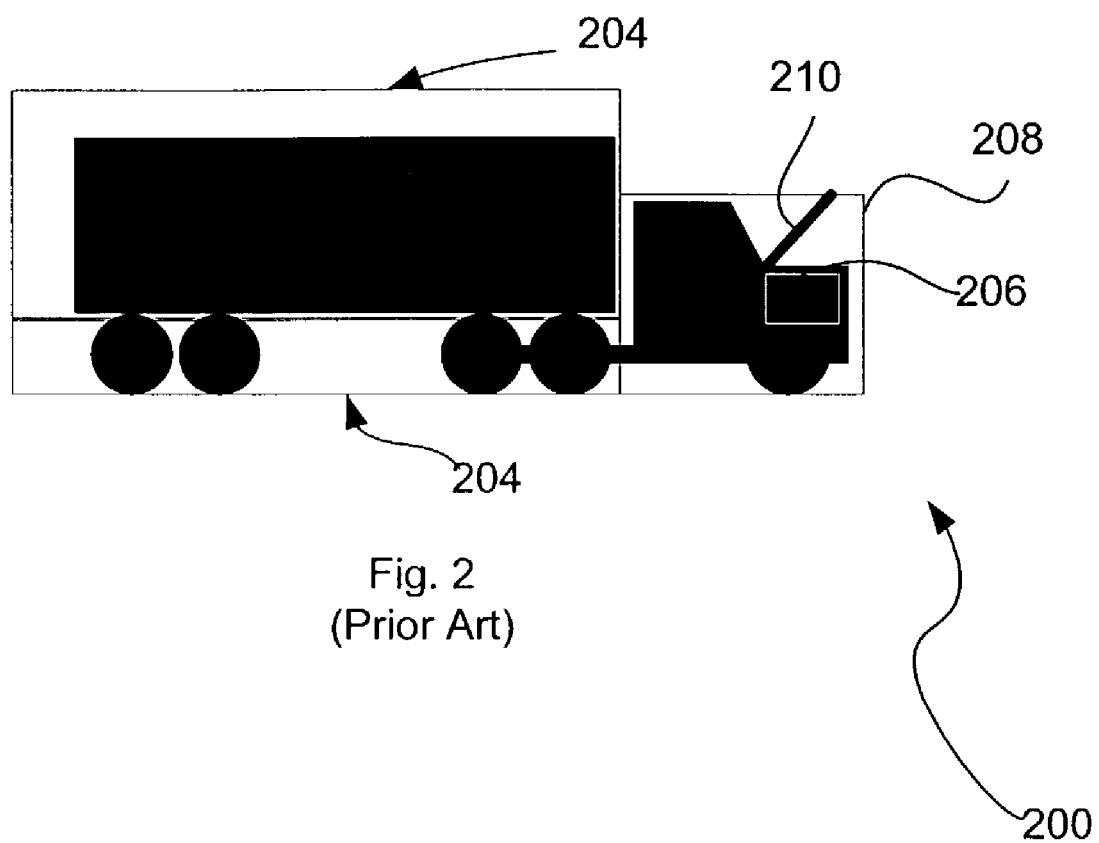
FIG. 2 illustrates an example of graphics processing that may be carried out utilizing the computer graphics system of FIG. 1, and a particular problem associated therewith.
Figure 3:
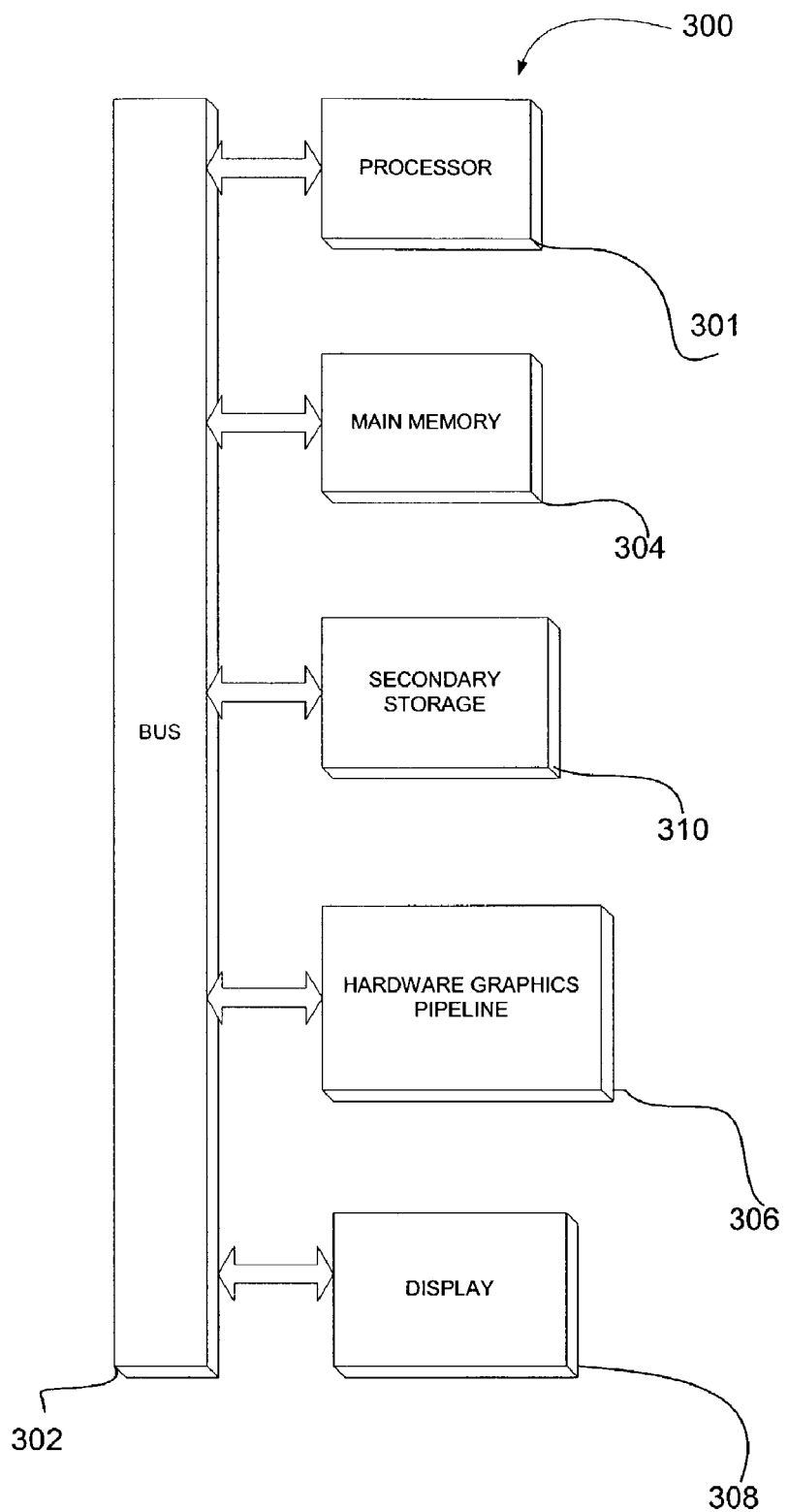
FIG. 3 is a block diagram of a digital processing system embodying a method and apparatus in accordance with one embodiment.

FIGS. 1–2 illustrate the prior art. FIG. 3 is a block diagram of a digital processing system embodying the method and apparatus in accordance with one embodiment. With reference to FIG. 3, a computer graphics system is provided that may be implemented using a computer 300. The computer 300 includes one or more processors, such as processor 301, which is connected to a communication bus 302. The computer 300 also includes a main memory 304. Control logic (software) and data are stored in the main memory 304 which may take the form of random access memory (RAM). The computer also includes a hardware graphics pipeline 306 and a display 308, i.e. a computer monitor.

The computer 300 may also include a secondary storage 310. The secondary storage 310 includes, for example, a hard disk drive and/or a removable storage drive, representing a floppy disk drive, a magnetic tape drive, a compact disk drive, etc. Computer programs, or computer control logic algorithms, are stored in the main memory 304 and/or the secondary storage 310. Such computer programs, when executed, enable the computer 300 to perform various functions. Memory 304 and storage 310 are thus examples of computer-readable media.

In one embodiment, the techniques to be set forth are performed by the hardware graphics pipeline 306 which may take the form of any type of hardware. Such hardware implementation may include a microcontroller or any other type of application specific integrated circuit (ASIC). In yet another embodiment, the method of the present invention may be carried out in part on the processor 301 by way of a computer program stored in the main memory 304 and/or the secondary storage 310 of the computer 300.

Figure 4:
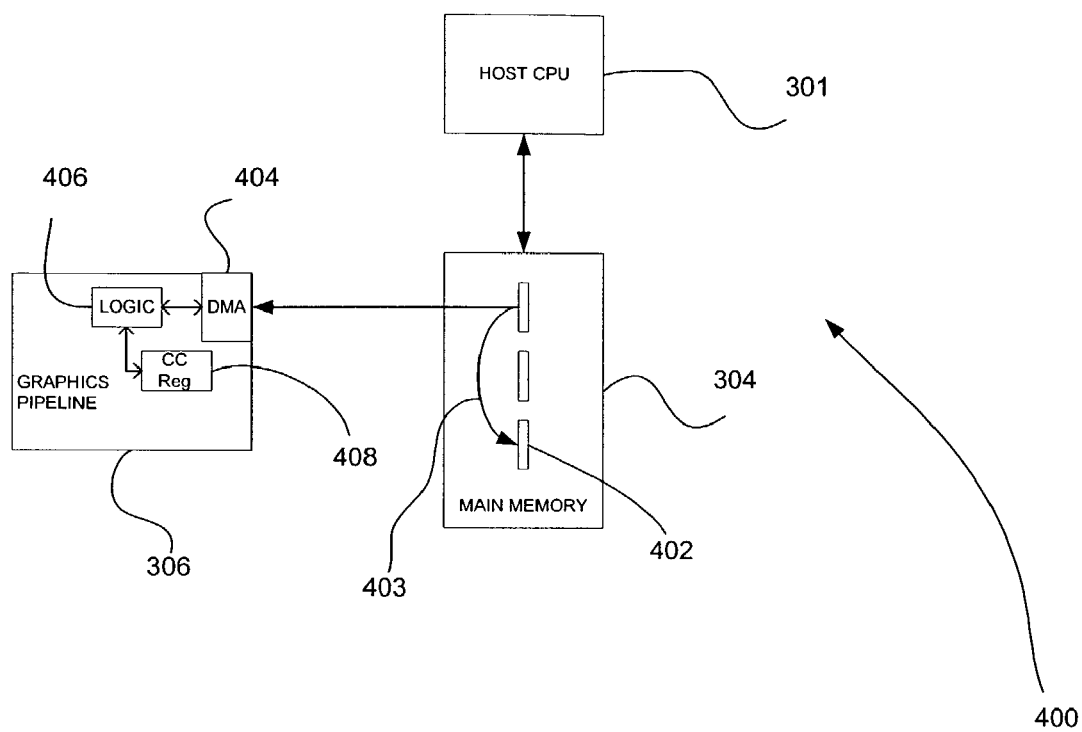
FIG. 4 illustrates one exemplary framework that may be implemented in the context of the computer of FIG. 3, in accordance with one embodiment.

FIG. 4 illustrates one exemplary framework 400 that may be implemented in the context of the computer 300 of FIG. 3, in accordance with one embodiment. While the present framework 400 is set forth herein, it should be noted that any desired framework 400 may be used to achieve the principles of the present invention. Further, the present framework 400 may or may not be used in the context of the computer 300 of FIG. 3.

The framework 400 includes one or more processors, such as processor 301, which is connected to a main memory 304. The framework 400 also includes a hardware graphics pipeline 306.

In use, a display list (i.e. any sequence of commands whether specified by a program as a distinct list or not) for the hardware graphics pipeline 306 may be supplied in series to be processed by the hardware graphics pipeline 306 by reading the display list commands from buffer locations 402 in the main memory 304. Unlike the prior art display list processing methods, the present framework 400 allows branching 403 among the commands in the main memory 304.

This is accomplished through use of a direct memory access (DMA) module 404 adapted for sequencing through the buffers 402 of the main memory 304. Logic 406 coupled to the DMA module 404 may be used to control the manner in which the buffers 402 of the main memory 304 are sequenced to achieve the branching 403. Further, condition data registers 408 may be coupled to the logic 406 to store various state information to facilitate the branching 403 in a manner that will soon be set forth.

Figure 4A:
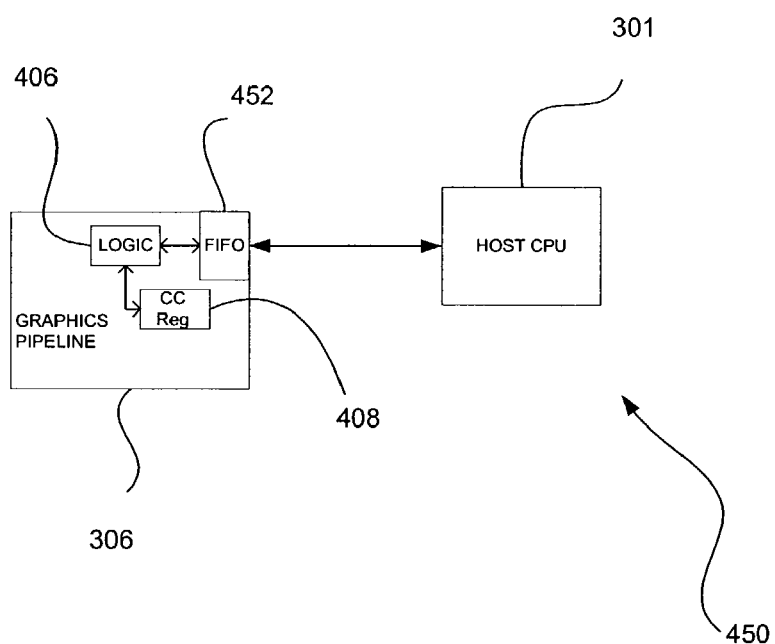
FIG. 4A illustrates another exemplary framework that may be implemented in the context of the computer of FIG. 3, in accordance with another embodiment.

FIG. 4A illustrates another exemplary framework 450 that may be implemented in the context of the computer 300 of FIG. 3, in accordance with another embodiment. Similar to the previous framework 400, the present framework 450 is set forth for illustrative purposes only, and should not be construed as limiting in any manner.

Similar to the previous framework 400, the present framework 450 includes a processor 301. The framework 400 also includes a hardware graphics pipeline 306. Instead of utilizing the main memory 304, the present framework 450 uses a first-in-first-out (FIFO) buffer 452 situated on the hardware graphics pipeline 306.

In use, a display list for the hardware graphics pipeline 306 may be supplied in series to be processed by the hardware graphics pipeline 306 by reading the display list commands from the FIFO buffer 452. Unlike the prior art display list processing methods, the present framework 450 allows branching among the commands in the FIFO buffer 452 under the direct control of the logic 406 coupled thereto. Further, condition data registers 408 may be coupled to the logic 406 to store various state information to facilitate the branching 403 in a manner that will soon be set forth.

Figure 5:
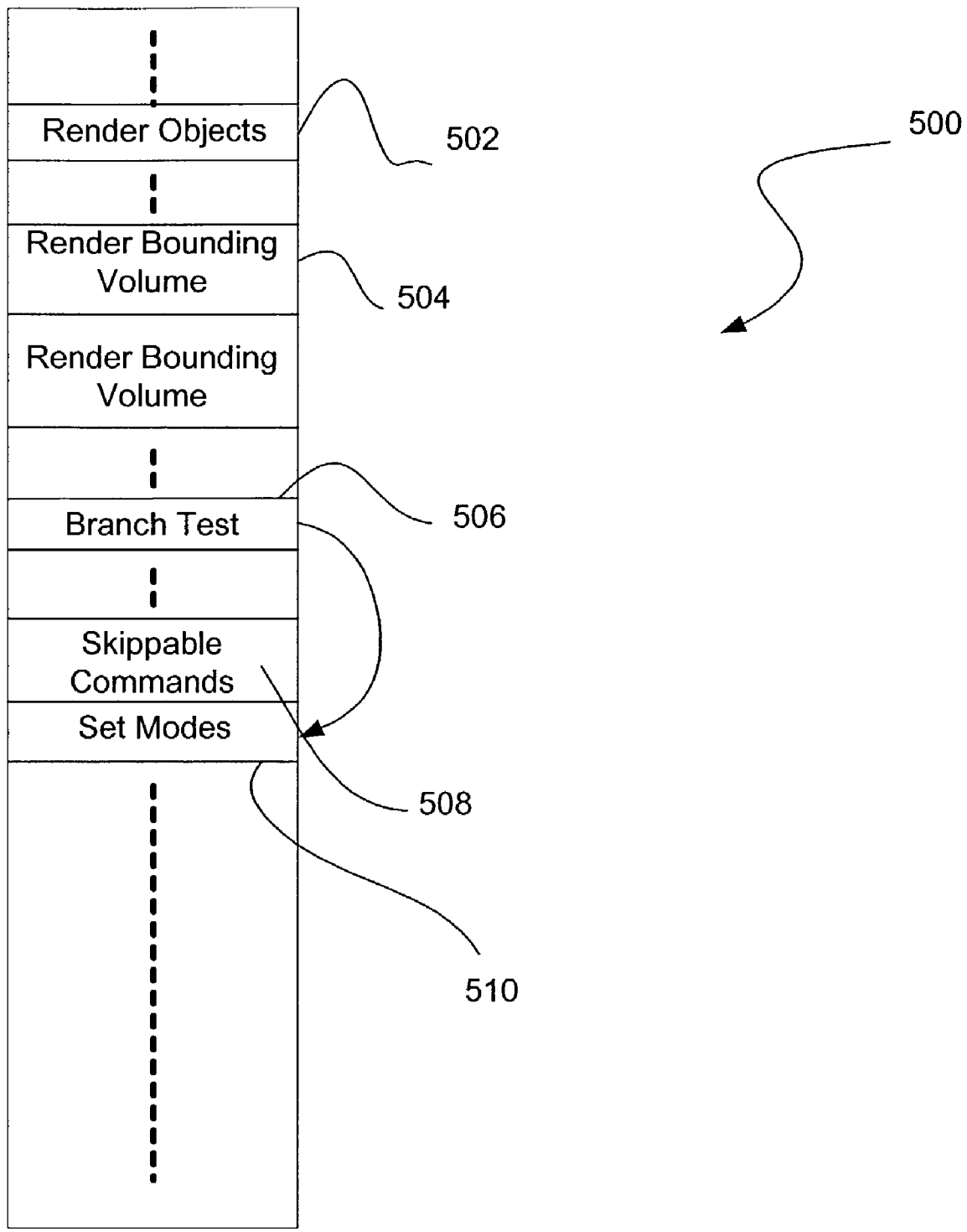
FIG. 5 illustrates exemplary contents of the memory of the foregoing frameworks of FIGS. 4 and 4A, in order to accomplish branching.

FIG. 5 illustrates exemplary contents 500 of the memory of the foregoing frameworks of FIGS. 4 and 4A, in order to accomplish branching. As shown, various commands may be included. In particular, first commands 502 may be provided for rendering objects utilizing the hardware graphics pipeline. Further, second commands 504 may be included for rendering specific bounding volumes. Bounding volumes may include not only boxes, convex hulls, and the like; but also any surface or geometry selected to yield a more conservative result (i.e. more likely to be visible than the object(s) it bounds).

Still yet, third commands 506 may be provided for branching among the remaining commands. Specifically, the third commands 506 may branch any desired skippable commands 508 based on desired criteria. In one embodiment, such criteria may include condition data, a threshold, and an associated test (i.e. a z-value test, stencil test, screen test, etc.).

Once the branching occurs, fourth commands 510 may be used to set a current mode of operation under which the hardware graphics pipeline is operating for reasons that will soon become apparent. The manner in which the aforementioned branching occurs will be set forth in greater detail during reference to FIGS. 6 and 7.

Figure 6:
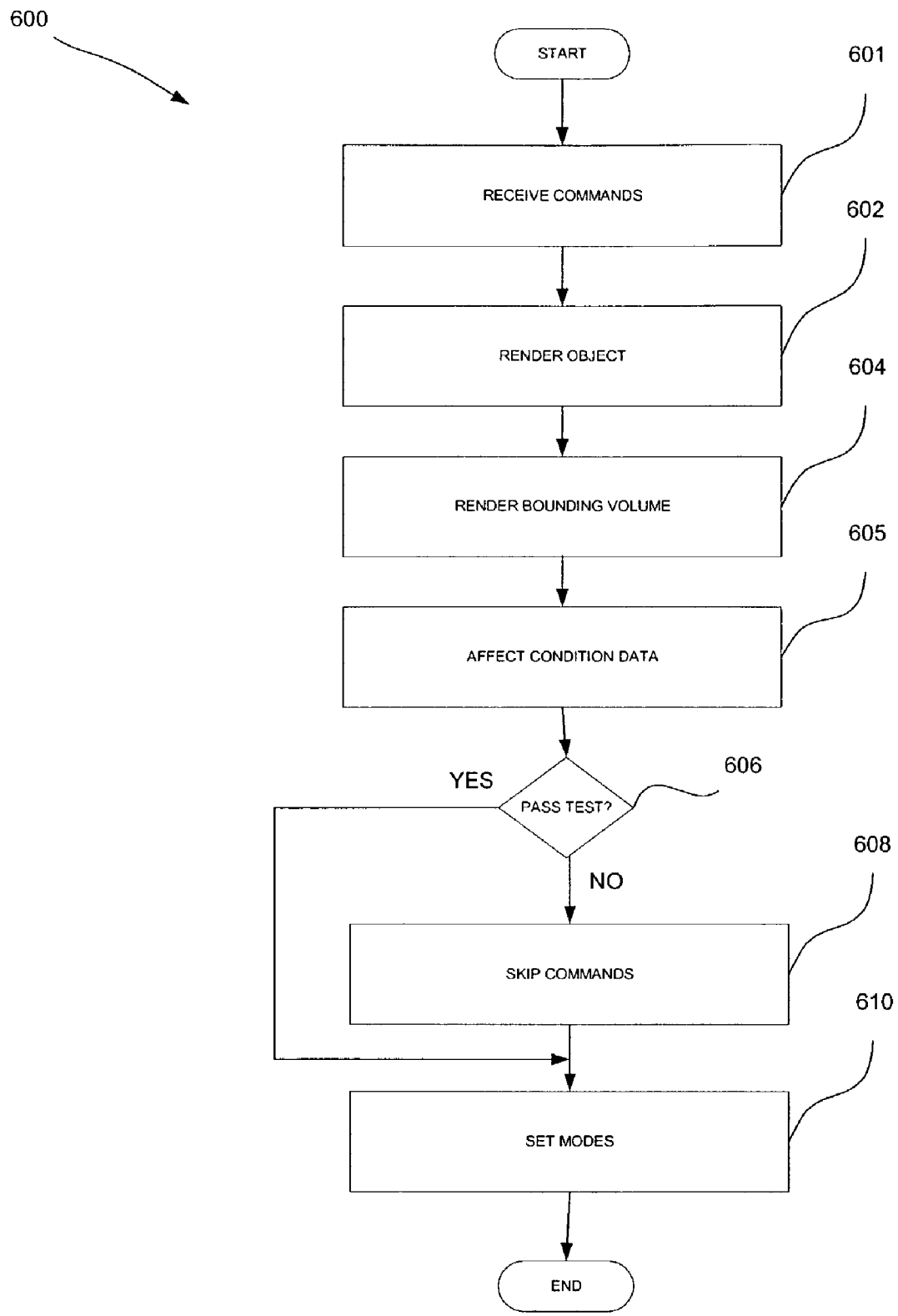
FIG. 6 illustrates a method for conditional branching in a hardware graphics pipeline.

FIG. 6 illustrates a method 600 for conditional branching in a hardware graphics pipeline. As an option, the present method 600 may be implemented in the context of the architecture of FIGS. 3–5. Of course, the present method 600 may be implemented in any desired environmental context.

Initially, in operation 601, a plurality of display list graphics commands is received in a buffer of a hardware graphics pipeline. The graphics commands are accessed in the buffer of the hardware graphics pipeline. As an option, a counter (i.e. count of number of pixels that pass a z-value test, etc.) may be cleared during the course of the execution of the graphics commands.

The objects are then rendered in response to the accessed graphics commands utilizing the hardware graphics pipeline. See operation 602. Further, bounding volumes (or non-bounding volumes) may be rendered in response to the accessed graphics commands utilizing the hardware graphics pipeline, as indicated in operation 604. See graphics commands 502 and 504 of FIG. 5. As an option, such rendering may include various tests (i.e. z-value tests, alpha tests, stencil tests, etc.) that may affect subsequent operations.

For reasons that will soon become apparent, condition data tracked in a condition data register may be used during the rendering utilizing the hardware graphics pipeline. It should be noted that the condition data may or may not be stored in the condition data register based on a timeframe in which it is needed. As an option, condition data may be associated with each of the bounding volumes being rendered.

As an option, a z-value culling operation may be employed in the context of the foregoing rendering in operation 604. In particular, such z-value culling operation may be used to accelerate operation 604, while still rendering the bounding volume if the bounding volume passes such z-value culling operation. Moreover, such z-value culling operation may be used to set the condition data. More information on such z-value culling operation may be found with reference to the related applications set forth hereinabove, which are incorporated herein by reference in their entirety.

By this design, the condition data may be affected by the rendering (i.e. the aforementioned tests) or any other criteria (i.e. thresholds, other condition data, the aforementioned counter, etc.) See operation 605. For example, the condition data may vary based on: whether a particular depth test has pass or failed, whether a threshold has been surpassed, a previous condition data value, a number of pixels processed, etc.

Next, in operation 608, various graphics commands may be skipped based on the condition data or any other parameter. In one embodiment, such branching may be conditioned not only on the condition data, but namely a test involving the condition data and a particular threshold. For example, branching can be conditional on the contents of the condition data and a particular threshold as compared by some test (i.e. greater than, less than, equal, etc.). This test may be performed for various purposes such as determining whether an object(s) is visible, etc. As an option, the branching may be conditionally performed based on multiple tests. As another option, a condition code (i.e. a 1-bit code) may be used to store and track results of the test(s) involving the condition data.

Thus, branching is effected in response to another graphics command utilizing the hardware graphics pipeline. Further, the branching may be effected to another graphics command for performing the desired rendering. Branching involves selecting a next address for commands; the address can be calculated or explicitly set in the branch instruction. A calculated address can use an offset from the current address.

With continuing reference to FIG. 6, modes may be set, as indicated in operation 610. This may be useful when a set of commands skipped would have changed a mode of operation (i.e. texturing mode, etc.), where such change in mode is expected and assumed by subsequent commands.

The present method 600 may be quite valuable when one of the aforementioned tests identifies a group of graphics commands to operate on objects not visible, as identified by the tests. By the foregoing decisions in the graphics pipeline, bandwidth between the buffer and the hardware graphics pipeline is saved, an option, the present method 600 may operate in the context of a "chunker," as will be set forth hereinafter in greater detail.

Figure 7:
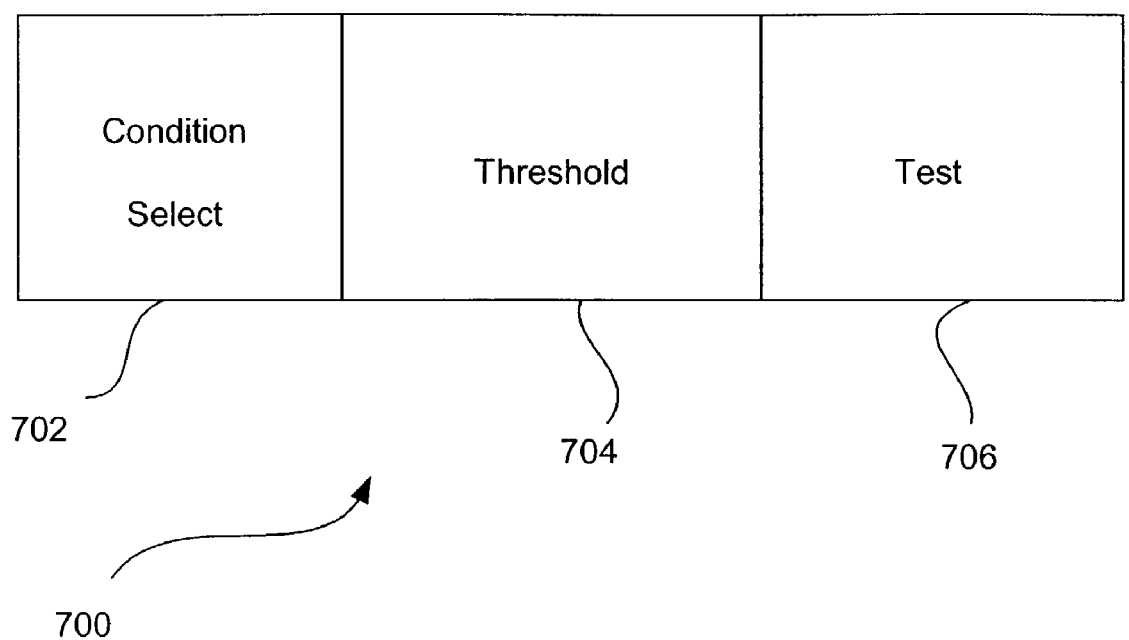
FIG. 7 illustrates a data structure for conditional branching in a hardware graphics pipeline, in accordance with one embodiment.

FIG. 7 illustrates a data structure 700 that may be included in a display list for conditional branching in a hardware graphics pipeline, in accordance with one embodiment. A condition data object 702 is provided for identifying condition data in condition data registers. As mentioned earlier, such condition data object 702 may be altered during rendering.

Further provided is a threshold object 704 for storing a threshold to be used in the aforementioned manner. Still yet a test object 706 is provided to identify the foregoing tests. Thus, the data structure 700 provides all of the information required to carry out the various operations of FIG. 6.

Figure 8:
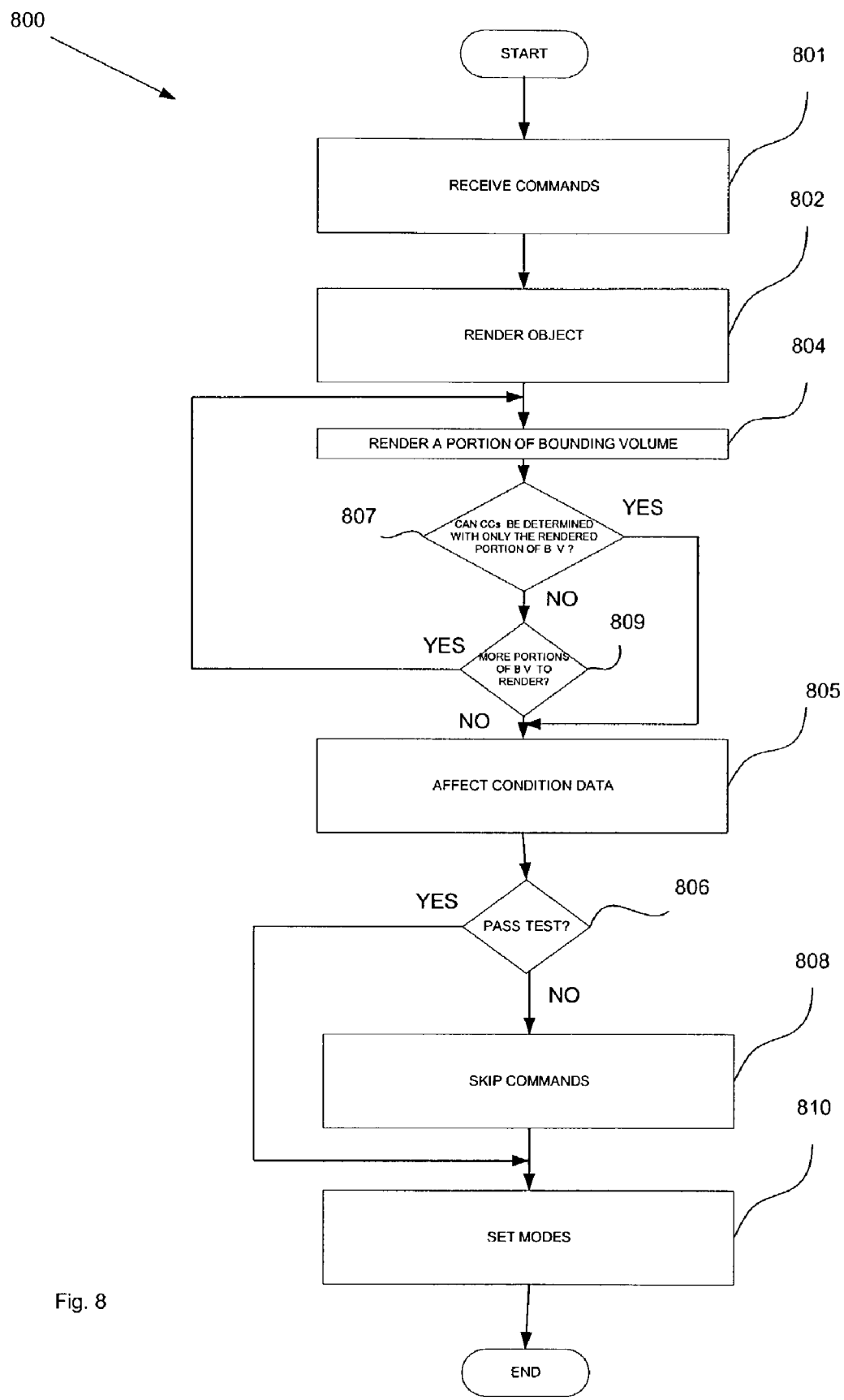
FIG. 8 illustrates another method for conditional branching in a hardware graphics pipeline, wherein a bounding volume is rendered on a portion-by-portion basis.

FIG. 8 illustrates another method 800 for conditional branching in a hardware graphics pipeline, wherein a bounding volume is rendered on a portion-by-portion basis. As an option, the present method 800 may be implemented in the context of the architecture of FIGS. 3–5. Of course, the present method 800 may be implemented in any desired environmental context.

Initially, in operation 801, a plurality of display list graphics commands is received in a buffer of a hardware graphics pipeline. The graphics commands are accessed in the buffer of the hardware graphics pipeline. The objects are then rendered in response to the accessed graphics commands utilizing the hardware graphics pipeline. See operation 802.

The present method 800 then proceeds differently with respect to the method 600 of FIG. 6. In particular, bounding volumes (or non-bounding volumes) are rendered on a portion-by-portion basis in response to the accessed graphics commands utilizing the hardware graphics pipeline. In particular, a portion of the bounding volume is rendered, as indicated in operation 804. As mentioned earlier, such rendering may include various tests (i.e. z-value tests, alpha tests, stencil tests, etc.) that may affect subsequent operations. In the context of the present description, a portion may include a pixel, a part of a polygon, a whole polygon, a group of polygons, or any part of the bounding volume.

After the current portion of the bounding volume has been rendered, it is determined if condition data can be determined with only the currently rendered portion(s) of the bounding volume. See operation 807. If it is determined that the condition data can be determined with only the rendered portion(s) of the bounding volume, the method 800 may progress to operation 805. If not, however, it is determined in decision 809 as to whether more portions of the bounding volume exist and, if so, another portion of the bounding volume is rendered in operation 804.

Operation then proceeds as method 600 of FIG. 6, and the condition data may be affected by the rendering or any other criteria. See operation 805. For example, the condition data may vary based on: whether a particular depth test has pass or failed, whether a threshold has been surpassed, a previous condition data value, a number of pixels processed, etc.

Next, in operation 808, various graphics commands may be skipped based on the condition data or any other parameter. Further, modes may be set, as indicated in operation 810. As mentioned earlier, this may be useful when a set of commands skipped would have changed a mode of operation (i.e. texturing mode, etc.), where such change in mode is expected and assumed by subsequent commands.

By embedding an occlusion test and branch in a display list, occlusion testing can be done by hardware during display list fetching. This permits the host processor to be working on other tasks, such as the preparation of subsequent frames.

In many computer graphics systems, the host processor prepares display lists several frames ahead of the hardware rendering cycle. In such cases, the host processor cannot be involved in decisions relating to the current frame. Embedding the decision in the display list makes the display list a "fire and forget" structure.

Specifically, display lists may manipulate a set of Boolean visibility flags or passing-pixel counts. Early in a frame, one or more flags may be reset (denoting "not visible"). A bounding box enclosing expensive-to-render geometry may be drawn (without color or z-value update, but with z-value testing). Rendering may be put in a mode where the indicated flag would be set (or count incremented) whenever a bounding box pixel passes its z-value test (i.e., would be visible). Later in the display list, a branch may test the flag or compare the count to a threshold; if the test says "visible", the following (expensive) geometry is drawn. If it says "not visible", the display list fetching jumps ahead to an address specified in the branch command. This address points just beyond the expensive geometry, avoiding its cost. If the skipped portion of the display list alters the rendering state, it can be followed by a post-amble that equivalently alters the state. Since there are many such flags, multiple bounding boxes can be tested sequentially, followed by a series of branches based on the results of each box test. This hides the latency between requesting the box drawing and having the result available for branching. To insure the results have returned, each flag can have a validity bit, set when the result returns. Testing an invalid flag stalls display list fetching until the flag becomes valid.

It is important to note that there are two distinct forms of conditional rendering from a chunking architecture's point of view: conditional rendering based on information generated from a bounding polytope, and conditional rendering based on information generated from a visibility test performed on some non-bounding geometry (such as the emitting surface of a light corona). In the former case, a chunking architecture can perform the conditional operations completely based on information local to the tile being processed, since the visibility of the portion of the conditionally rendered object within the tile is determined by the portion of the bounding polytope within the same tile. In the latter case, information non-local to the tile being processed is needed before conditional rendering can be performed; due to this a flush of the rendering pipeline between the visibility tests and the conditionally rendered objects must be performed. This latter form of conditional rendering is greatly aided by the use of a multiple-bit visibility vector as detailed below, since this allows the controlling software to group all visibility tests to be performed before the flush. Note that the use of a multiple-bit visibility vector also benefits a conventional architecture since a potentially nontrivial amount of time may pass between a visibility test being issued and being resolved against the depth or stencil buffers; queuing multiple such tests whose results are placed in subsequent slots in the bit vector allows these tests to be pipelined.

The present embodiment is ideally suited for occlusion culling, since results of various z-value, stencil, and other types of tests do not have to be sent to a processor for conditionally reducing the workload of the graphics hardware pipeline. This may be useful both for culling whole objects by first drawing a bounding envelope to test against, and also for performing special effects such as light coronas where the visibility of a smaller region (the point or surface of a light emitter) dictates whether a larger corona should be rendered. Since the second case potentially requires information from outside the current tile being rasterized, it would have to be accomplished in two rendering passes (though it can use the same hardware as the first case and does not require a full flush of depth or other intermediate information).

An example will now be set forth. The example involves a single-bit "visibility detected" latch, a bit vector used as the condition data, and a register which controls the update of the bit vector and rasterization of subsequent primitives. The operations the control register should be able to perform are shown in Table #1.

TABLE 1 select a.bit from the bit vector
clear selected bit
clear entire bit vector
kill subsequent fragments on condition:
   never
   selected bit is 0
   selected bit is 1
   bits 0 . . . selected bit are all 0
   bits 0 . . . selected bit contain some 0's
   bits 0 . . . selected bit contain some 1's
   bits 0 . . . selected bit are all 1
   always
move prior value of visibility detector to selected bit
clear visibility detector Fragments passing alpha, stencil and depth tests may set the visibility detected latch, which is only cleared by explicit software control. The size of the bit vector limits the number of objects one could render which depend on non-local information to determine visibility (i.e. light coronas). A reasonable size might be 256. The corona rendering pseudocode may, in one embodiment, include that shown in Table #2.

TABLE 2 begin scene
clear the bit vector
render opaque geometry (the world & all objects)
for each light
   allocate a bit in the bit vector
   clear visibility detector
   disable fragment generation
   render point or polygon covering light emitter
   set allocated bit if visible
   glFlush( ) or end/begin scene (omitting clear so we read back prior color values)
   for each corona TABLE 2-continued disable fragment generation if allocated bit is 0
   (i.e. light hidden)
     draw corona
end scene In an alternate embodiment, automatic visibility detection systems (VS) in both traditional and chunking or tile-based rendering architectures can take advantage of conditional rendering to discard occluded fragments earlier in the pipeline, before they travel to the pixel processor (PP). Two-pass or double-Z (DZ) algorithms can further take advantage of early occlusion detection during the first pass of the visibility algorithm as detailed below.

In tile-based graphics architecture, a bounding volume test-geometry may be sent before each complex object. If none of the bounding volume's pixels are visible in the current tile, the VS skips forward in the geometry stream to the matching end-conditional token. A possible implementation could consist of a token stream like that shown in Table #3.

TABLE 3

<begin conditional geom, "if"> #5
   . . .
   <bounding geometry>
   . . .
   <end bounding geom token, "then"> #5
   . . .
   <conditionally rendered geometry>
   . . .
<end conditional geom, "endif"> #5

The conditional may have a tag field (#5 in the above example) to allow hierarchical nesting of bounding volumes. The bounding geometry may be rasterized and its visibility tested against a Z envelope on both DZ passes; first pass eliminates VS rasterization in the early-Z case; second pass catches occlusion by later geometry. Short-circuit evaluation could be used to skip to the <end bounding geom> token when the first visible part is detected on second pass. The fragments from the bounding geom are always discarded.

The present embodiment thus provides high-level culling at per-tile granularity, potentially huge speedups if app is unable/unwilling to do model LOD management.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents. The order of elements within claims does not indicate any particular order of steps or operations.

What is claimed is:

1. A method for conditional branching in a hardware graphics pipeline, comprising:
   receiving a plurality of graphics commands;
   affecting condition data based on at least some of the graphics commands utilizing the hardware graphics pipeline; and
   conditionally skipping at least one of the graphics commands based on the condition data in response to another graphics command utilizing the hardware graphics pipeline;

wherein the condition data that governs the conditional skipping of the at least one graphics command is affected by rendering initiated by the graphics commands.

2. The method as set forth in claim 1, wherein the at least one graphics command is conditionally skipped for improving a performance of the hardware graphics pipeline.

3. The method as set forth in claim 1, wherein the graphics commands are received in a buffer.

4. The method as set forth in claim 3, wherein the graphics commands are accessed utilizing a controller of the hardware graphics pipeline coupled to the buffer.

5. The method as set forth in claim 1, wherein the condition data is tracked in a condition data register of the hardware graphics pipeline.

6. The method as set forth in claim 1, wherein the at least one graphics command is conditionally skipped utilizing logic of the hardware graphics pipeline.

7. The method as set forth in claim 1, wherein the condition data is affected by a z-value culling operation.

8. The method as set forth in claim 1, wherein the rendering includes a test, a result of which affects the condition data.

9. The method as set forth in claim 8, wherein the test includes a depth test.

10. The method as set forth in claim 8, wherein the test includes a stencil test.

11. The method as set forth in claim 8, wherein the test includes a visibility test.

12. The method as set forth in claim 1, wherein the rendering is performed in response to the graphics commands utilizing the hardware graphics pipeline.

13. The method as set forth in claim 12, wherein objects are rendered.

14. The method as set forth in claim 12, wherein bounding volumes are rendered.

15. The method as set forth in claim 14, wherein the bounding volumes are rendered on a portion-by-portion basis.

16. The method as set forth in claim 14, wherein the rendering of the bounding volumes is accelerated using a z-value culling operation.

17. The method as set forth in claim 12, and further comprising identifying the condition data during the rendering utilizing the hardware graphics pipeline.

18. The method as set forth in claim 17, and further comprising identifying a threshold during the rendering utilizing the hardware graphics pipeline.

19. The method as set forth in claim 18, and further comprising performing a test based on the threshold during the rendering utilizing the hardware graphics pipeline.

20. The method as set forth in claim 19, and further comprising affecting the condition data based on the test utilizing the hardware graphics pipeline.

21. The method as set forth in claim 1, wherein the graphics commands define a bounding volume that is involved in a depth test utilizing the hardware graphics pipeline.

22. The method as set forth in claim 1, wherein the condition data is tracked utilizing a condition code.

23. The method as set forth in claim 1, wherein the condition data includes a multiple-bit visibility vector.

24. The method as set forth in claim 1, and further comprising rendering non-bounding volumes in response to the graphics commands utilizing the hardware graphics pipeline.

25. The method as set forth in claim 1, wherein the skipped graphics commands are not received by the hardware graphics pipeline.

26. A system for conditional branching in a hardware graphics pipeline, comprising:
    means for receiving a plurality of graphics commands;
    means for affecting condition data based on at least some of the graphics commands utilizing the hardware graphics pipeline; and
    means for conditionally skipping at least one of the graphics commands based on the condition data in response to another graphics command utilizing the hardware graphics pipeline;
    wherein the condition data that governs the conditional skipping of the at least one graphics command is affected by rendering initiated by the graphics commands.

27. A hardware graphics pipeline for conditional branching, comprising:
    a buffer for receiving a plurality of graphics commands;
    a condition data register for storing condition data based on the graphics commands; and
    logic coupled to the buffer and the condition data register, the logic capable of conditionally skipping at least one of the graphics commands based on the condition data in response to another graphics command;
    wherein the condition data that governs the conditional skipping of the at least one graphics command is affected by rendering initiated by the graphics commands.

28. A tile-based hardware graphics pipeline for conditional branching, comprising:
    a buffer for receiving a plurality of graphics commands in the tile-based hardware graphics pipeline;
    a condition data register for storing condition data based on the graphics commands; and
    tile-based hardware graphics pipeline logic coupled to the buffer and the condition data register, the tile-based hardware graphics pipeline logic capable of conditionally skipping at least one of the graphics commands based on the condition data in response to another graphics command for discarding occluded fragments;
    wherein the condition data that governs the conditional skipping of the at least one graphics command is affected by rendering initiated by the graphics commands.

29. A method for conditional branching in a hardware graphics pipeline, comprising:
    receiving a plurality of graphics commands in a buffer of the hardware graphics pipeline;
    accessing the graphics commands in the buffer of the hardware graphics pipeline;
    rendering objects in response to the accessed graphics commands utilizing the hardware graphics pipeline,
    rendering bounding volumes in response to the accessed graphics commands utilizing the hardware graphics pipeline;
    identifying condition data during the rendering utilizing the hardware graphics pipeline;
    identifying a threshold during the rendering utilizing the hardware graphics pipeline;
    performing a test based on the threshold during the rendering utilizing the hardware graphics pipeline;
    affecting the condition data based on the test utilizing the hardware graphics pipeline; and conditionally skipping at least one of the graphics command based on the condition data in response to another graphics command utilizing the hardware graphics pipeline;

wherein the condition data that governs the conditional skipping of the at least one graphics command is affected by the rendering initiated by the graphics commands.

30. A method for direct memory access, comprising:

receiving a plurality of pointers to graphics commands;

utilizing at least one of the pointers to fetch the graphics commands by direct memory access;

processing the fetched graphics commands in a hardware graphics pipeline, at least some of the processed graphics commands affecting condition data; and conditionally skipping at least one of the graphics commands based on the condition data, the skipping being done by not fetching the conditionally skipped commands by the direct memory access;

wherein the condition data that governs the conditional skipping of the at least one graphics command is affected by rendering initiated by the graphics commands.

31. The method as set forth in claim 30, wherein the at least one graphics command is conditionally skipped for improving a performance of the hardware graphics pipeline.

32. The method as set forth in claim 30, wherein the graphics commands are received in a buffer.

33. The method as set forth in claim 32, wherein the graphics commands are accessed utilizing a controller of the hardware graphics pipeline coupled to the buffer.

34. The method as set forth in claim 30, wherein the condition data is tracked in a condition data register of the hardware graphics pipeline.

35. The method as set forth in claim 30, wherein the at least one graphics commands is conditionally skipped utilizing logic of the hardware graphics pipeline.

36. The method as set forth in claim 30, wherein the condition data is affected by a z-value culling operation.

37. The method as set forth in claim 30, wherein the rendering includes a test, a result of which affects the condition data.

38. The method as set forth in claim 37, wherein the test includes a depth test.

39. The method as set forth in claim 37, wherein the test includes a stencil test.

40. The method as set forth in claim 37, wherein the test includes a visibility test.

41. The method as set forth in claim 30, wherein the rendering is performed in response to the graphics commands utilizing the hardware graphics pipeline.

42. The method as set forth in claim 41, wherein objects are rendered.

43. The method as set forth in claim 41, wherein bounding volumes are rendered.

44. The method as set forth in claim 43, wherein the bounding volumes are rendered on a portion-by-portion basis.

45. The method as set forth in claim 43, wherein the rendering of the bounding volumes is accelerated using a z-value culling operation.

46. The method as set forth in claim 41, and further comprising identifying the condition data during the rendering utilizing the hardware graphics pipeline.

47. The method as set forth in claim 46, and further comprising identifying a threshold during the rendering utilizing the hardware graphics pipeline.

48. The method as set forth in claim 47, and further comprising performing a test based on the threshold during the rendering utilizing the hardware graphics pipeline.

49. The method as set forth in claim 48, and further comprising affecting the condition data based on the test utilizing the hardware graphics pipeline.

50. The method as set forth in claim 30, wherein the graphics commands define a bounding volume that is involved in a depth test utilizing the hardware graphics pipeline.

51. The method as set forth in claim 30, wherein the condition data is tracked utilizing a condition code.

52. The method as set forth in claim 30, wherein the condition data includes a multiple-bit visibility vector.

53. The method as set forth in claim 30, and further comprising rendering non-bounding volumes in response to the graphics commands utilizing the hardware graphics pipeline.

* * * * *

UNITED STATES PATENT AND TRADEMARK OFFICE
CERTIFICATE OF CORRECTION

| | | |
|---|---|---|
| PATENT NO. | : 7,170,513 B1 | Page 1 of 1 |
| APPLICATION NO. | : 10/188697 | |
| DATED | : January 30, 2007 | |
| INVENTOR(S) | : Voorhies et al. | |

It is certified that error appears in the above-identified patent and that said Letters Patent is hereby corrected as shown below:

In the claims:
Col. 12, line 54, please replace "pipeline," with --pipeline;--.

Signed and Sealed this
Thirteenth Day of September, 2011

David J. Kappos
*Director of the United States Patent and Trademark Office*